(12) United States Patent
Ting et al.

(10) Patent No.: US 8,683,562 B2
(45) Date of Patent: Mar. 25, 2014

(54) SECURE AUTHENTICATION USING ONE-TIME PASSWORDS

(75) Inventors: David M. T. Ting, Sudbury, MA (US); Jason Mafera, Francestown, NH (US)

(73) Assignee: Imprivata, Inc., Lexington, MA (US)

( * ) Notice: Subject to any disclaimer, the term of this patent is extended or adjusted under 35 U.S.C. 154(b) by 0 days.

(21) Appl. No.: 13/363,771

(22) Filed: Feb. 1, 2012

(65) Prior Publication Data

US 2012/0204245 A1  Aug. 9, 2012

Related U.S. Application Data

(60) Provisional application No. 61/439,173, filed on Feb. 3, 2011.

(51) Int. Cl.
*H04L 29/06* (2006.01)

(52) U.S. Cl.
USPC ........................................ 726/6; 726/7; 726/8

(58) Field of Classification Search
USPC ........................................................ 726/6–8
See application file for complete search history.

(56) References Cited

U.S. PATENT DOCUMENTS

| 5,546,471 | A | 8/1996 | Merjanian |
|---|---|---|---|
| 5,596,454 | A | 1/1997 | Hebert |
| 5,844,497 | A | 12/1998 | Gray |
| 5,920,642 | A | 7/1999 | Merjanian |
| 6,028,950 | A | 2/2000 | Merjanian |
| 6,041,134 | A | 3/2000 | Merjanian |
| 6,087,955 | A | 7/2000 | Gray |
| 6,268,788 | B1 | 7/2001 | Gray |
| 6,367,017 | B1 | 4/2002 | Gray |
| 6,618,806 | B1 | 9/2003 | Brown et al. |
| 6,928,547 | B2 | 8/2005 | Brown et al. |
| 7,356,705 | B2 | 4/2008 | Ting |
| 7,398,549 | B2 | 7/2008 | Ting |
| 7,660,880 | B2 * | 2/2010 | Ting et al. ..................... 709/223 |
| 7,941,849 | B2 | 5/2011 | Ting |
| 7,950,021 | B2 | 5/2011 | Ting et al. |
| 2002/0174344 | A1 | 11/2002 | Ting |
| 2002/0174347 | A1 | 11/2002 | Ting |
| 2004/0015243 | A1 | 1/2004 | Mercredi et al. |
| 2004/0187029 | A1 | 9/2004 | Ting |
| 2004/0205176 | A1 * | 10/2004 | Ting et al. ..................... 709/223 |
| 2005/0050330 | A1 * | 3/2005 | Agam et al. ................... 713/172 |
| 2005/0165684 | A1 | 7/2005 | Jensen et al. |
| 2005/0221798 | A1 * | 10/2005 | Sengupta et al. ............. 455/411 |
| 2005/0273866 | A1 | 12/2005 | Brown et al. |
| 2006/0136741 | A1 | 6/2006 | Mercredi |
| 2007/0101152 | A1 | 5/2007 | Mercredi et al. |
| 2007/0136792 | A1 | 6/2007 | Ting et al. |
| 2007/0186106 | A1 * | 8/2007 | Ting et al. ..................... 713/168 |
| 2007/0220274 | A1 | 9/2007 | Jensen et al. |
| 2008/0028230 | A1 * | 1/2008 | Shatford ....................... 713/186 |
| 2008/0034219 | A1 | 2/2008 | Ting |
| 2008/0072058 | A1 * | 3/2008 | Cedar et al. ................... 713/184 |
| 2008/0184349 | A1 | 7/2008 | Ting |
| 2008/0301816 | A1 | 12/2008 | Ting et al. |

(Continued)

*Primary Examiner* — Chau Le
(74) *Attorney, Agent, or Firm* — Bingham McCutchen LLP

(57) ABSTRACT

Embodiments of the invention facilitate the use of a contact-less memory token to automate log-on procedures to a remote access server using dynamic one-time passwords (OTPs). A series of workflow steps establishes the identity of the user and charges a token with a number of dynamic OTPs that can be subsequently verified using, for example, a Radius server sitting behind a VPN or SSL/VPN server.

18 Claims, 2 Drawing Sheets

(56) References Cited

U.S. PATENT DOCUMENTS

| | | |
|---|---|---|
| 2008/0312954 A1 | 12/2008 | Ullrich et al. |
| 2009/0100270 A1 | 4/2009 | Ting |
| 2009/0104888 A1* | 4/2009 | Cox .............................. 455/410 |
| 2009/0172812 A1 | 7/2009 | Mercredi |
| 2009/0210940 A1* | 8/2009 | Dean .............................. 726/19 |
| 2009/0228968 A1 | 9/2009 | Ting |
| 2010/0017856 A1 | 1/2010 | Mercredi et al. |
| 2010/0111363 A1 | 5/2010 | Kelly et al. |
| 2010/0114600 A1 | 5/2010 | Carosso et al. |
| 2011/0145908 A1 | 6/2011 | Ting |
| 2011/0314539 A1* | 12/2011 | Horton ............................ 726/20 |

* cited by examiner

SECURE AUTHENTICATION USING ONE-TIME PASSWORDS

RELATED APPLICATION

This application claims priority to, and the benefits of, U.S. Ser. No. 61/439,173, filed on Feb. 3, 2011, the entire disclosure of which is hereby incorporated by reference.

FIELD OF THE INVENTION

The invention relates generally to controlling and managing computer system access and authentication, and in particular, to the use of one-time passwords.

BACKGROUND

Large corporations utilize computer-based applications to support critical functions in virtually every area of operation. For example, companies may employ separate applications for electronic mail, document control, financial applications, inventory management, manufacturing control and engineering functions, as well as overall management of network access. Each application often requires a separate log-on procedure, including provision of some form of known personal identification such as a user ID, a password or a key sequence, or the validation of some inherent (e.g., biometric) trait or characteristic of the user. The large and increasing number of applications requiring user authentication burdens both the users and systems administrators with creating, remembering, and securing these various forms of authentication data. From a management perspective, the proliferation of computer applications with varying security and sign-on procedures adds significant cost to the ongoing maintenance of a secure information-technology infrastructure. Complicating these challenges is the increasing need for users to access secure (i.e., behind a firewall) computing resources from remote and often unsecure locations, such as a home computer, public wireless networks and mobile devices.

Allowing unauthenticated users to connect to a corporate backbone from an unknown remote computer is fraught with security risks. For example, legitimate log-on credentials can be "sniffed" from the network (whether it is wired or wireless), or captured using malware (such as a keyboard logger) or even by surreptitious surveillance ("shoulder surfing"). To combat these challenges, security-minded organizations have implemented tokens that generate one-time passwords (OTP) or perform cryptographic functions. OTPs (also known as dynamic passwords) are popular because they can be used with any log-on procedure that accepts a password, and they ensure security of the account due to the limited lifespan of the password.

Typically, OTPs are generated by a dedicated device (such as the Go-Token from Vasco) or a software program running on a personal digital assistant (PDA), or in some cases the OTP is transmitted over a cell phone using Short Message Service (SMS). While this usage model may suit the casual user, it can be frustrating for users who must frequently transcribe the six or more OTP characters from a display to an input field. This problem is exacerbated in a wireless environment that may require periodic reauthentication based on time limits, roaming, or both. Furthermore, because wireless communications are easier to "sniff," it is common to require one OTP to connect the client to a wireless access point (WAP), and a second OTP to initiate a virtual private network (VPN) tunnel. Frequently users may be required to wait a predetermined amount of time before using the next OTP code, resulting in an even longer delay before being able to reconnect to the network.

Client-resident single-sign-on (SSO) agents can automate the delivery of static passwords into specific log-on screens once a user is authenticated to a system. The client agent has access to a credential store that contains a cache of static passwords that are either manually entered by the user, or learned by capturing the log-on credentials during an authentication process. However, SSO systems generally rely on static passwords that remain the same for each application and are synchronized with the log-on credentials for that application. As such, current client-side SSO systems do not work in conjunction with single-use passwords because users must complete a password update cycle with each access request in order to update the password retained by the SSO system.

What is needed, therefore, are systems and techniques that can combine the security of OTP-based authentication and the convenience of SSO applications.

SUMMARY OF THE INVENTION

Embodiments of the present invention provide user authentication and access control that combine the use of OTP and SSO. In remote access implementations, a client-resident SSO agent automates the delivery of pre-stored OTPs into a log-on screen. For example, users frequently gain remote access to a secure network via a VPN—i.e., a communication session, or "VPN tunnel," that occurs over the public telecommunication infrastructure but nonetheless provides security comparable to a dedicated physical connection to the secure network. A VPN user typically experiences the secure network in a manner identical to a direct connection. Secure VPNs use cryptographic tunneling protocols to provide confidentiality by blocking intercepts and packet sniffing, allowing sender authentication to block identity spoofing, and provide message integrity by preventing message alteration. For example, a VPN and/or SSL/VPN server associated with the secure network authenticates users (e.g., against an authentication server such as a back-end Radius server) and, upon successful authentication, cooperates with the local client computer to set up the VPN session.

In accordance with embodiments of the present invention, a client-resident SSO agent automates the delivery of pre-stored OTPs into a log-on screen, e.g., a VPN dialog. Because the server is in secure communication with the SSO system—i.e., each of the two systems inherently trusts data sent from the other—it is able to authenticate the user's OTP using, for example, intrinsic knowledge of OTPs that were or can be generated for that user. In VPN implementations, a VPN tunnel does not exist for the initial authentication step. Consequently, the SSO agent authenticates users offline and decrypts stored OTPs so the passwords can be delivered into the log-on screen and passed to the VPN server for verification by the back-end authentication server.

Offline authentication by the SSO agent can be used more generally in situations where the client is disconnected from, or lacks a trustworthy channel to, a remote SSO server. In such cases the SSO agent can securely manage confidential information (e.g., hashed passwords, biometrics, shared secrets) that can be used to authenticate the identity of user, decrypt stored OTP codes, or recognize the log-on screens for the VPN or wireless log-on.

Therefore, a first aspect of the invention relates to a client computer operable for authenticating a user to a secure resource. In various embodiments, the computer comprises a processor; a client-resident credential-management module, executable by the processor, for obtaining one or more limited-lifespan user-authentication credentials; and a client-resident SSO agent, executable by the processor, for providing the authentication credentials to a plurality of secure applications to thereby facilitate user access thereto. In some embodiments, the limited-lifespan user-authentication credential(s) are stored on a secure memory token, and the client computer may further comprise (or be connected to) a reader, which is in operative communication with the credential-management module, for obtaining the limited-lifespan user-authentication credential(s) from the token.

In various embodiments, the client-resident credential-management module is configured to interrogate the secure memory token via the reader. The client computer can include a communications module facilitating communications over a computer network, enabling the client-resident credential-management module to communicate, via the communications module, with a server-resident password manager that administers the limited-lifespan authentication credentials.

In some embodiments, the secure memory token is a contactless smartcard, which can be interrogated by the client-resident credential-management module via a wireless card reader. The token may include multiple secure memory partitions, each associated with one or more secure applications operating on the secure system. In some instances, the client-resident management module authenticates the user's identity based on authentication credentials stored on the client, whereas in other cases it uses credentials stored on the token.

For example, the user-authentication credentials may comprise or consist of one or more of a password, a user identifier, or a biometric credential. Alternatively, the user-authentication credentials comprise or consist of a plurality of one-time passwords generated by a server-resident password manager, in which case the SSO agent may facilitate automated log-on of the user to the applications by means of the one or more limited-lifespan user-authentication credentials obtained by the reader. In some cases, the interrogation of the secure memory token includes reading authentication credentials from the token and providing the credentials to the SSO agent, thereby facilitating the automated log-on of the user to the secure applications. Interrogation can include writing credentials to the token to replenish the supply of credentials available to the system.

In another aspect, the invention relates to a computer storage facility for facilitating the authentication of a user to a secure computer system. In various embodiments, the storage facility comprises or consists of a plurality of separately-addressable read-write memory partitions, wherein a first partition is configured to store a plurality of limited-lifespan authentication credentials. The limited-lifespan authentication credentials may, for example, comprise single-use passwords. In some embodiments, the first partition is further configured to accept new authentication credentials, thereby replenishing a supply of credentials. The user-authentication credentials may have a limited lifespan, such as a number of use and/or a date/time expiration. In some cases, the credentials may be valid for only a single-use.

Another aspect of the invention pertains to a method for authenticating a user to a secure resource. In various embodiments, the method includes the steps of interrogating a secure memory token as it is presented at a client device from which a user is requesting access to the secure resource. In various embodiments, the identity of the user is authenticated based on a user-authentication credential (separate from the pre-stored OTPs) stored on the secure memory token. The method may also include the steps of receiving a limited-lifespan user-authentication credential from the secure memory token and using the credential to automatically populate user access screens of the secure resource. As a result, the user is granted access to the secure resource without having to manually provide the credentials. In various implementations, receipt of browser-renderable instructions encoding a log-on screen (e.g., an HTML or XML web page) is detected at the client, and a client-resident SSO agent automatically injects one or more pre-stored OTPs into an appropriate portion of the log-on screen. The log-on screen is thereupon submitted to its source via a computer network (typically the Internet).

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In various embodiments, the present invention provides comprehensive access-control techniques and supporting systems that facilitate multiple user authentication modalities. By using a client-resident software agent to intercept a user's request to access a secure resource and secure tokens to store OTPs, the invention combines the increased security of single-use or limited-use passwords with the convenience of SSO applications.

Secure memory tokens (e.g., smart cards, contact cards, contactless cards, etc.) allow confidential information to remain in the possession of the user instead of being stored on a hard drive, where it may be subject to theft or spoofing. Typically, a PIN, password, or biometric credential is provided by the user to unlock the contents of the memory token for access by the computer. Contact smartcards, for example, have been around for many years and have the ability to secure (using embedded cryptography) access to not only private encryption keys but also application data. Such contact-based secure memory tokens require direct contact with the reader in order to provide access, and consequently, a user typically inserts and removes the card from either a tethered USB reader or an embedded reader. This usage model is cumbersome due to the need to find and insert the card into a narrow card reader slot; moreover, cards are often left in the reader, creating security risks and inconvenience.

Certain contactless smartcards that use protocols such as HID iClass or Mifare provide secured application areas within the card memory that can be accessed once the identity of the user is established. A chain of trust is created (using, for example, cryptographic processing), connecting the application to the contactless card reader (often embedded in a keyboard or laptop casing) to the contactless card and, finally, to the secured application area in the card memory. Once user access is granted, the application software can read and/or write to the card while the card is in communication with the reader. This permits off-line user authentication for many mobile applications and secure remote access using OTP.

1. Representative System Architecture

Figure 1:
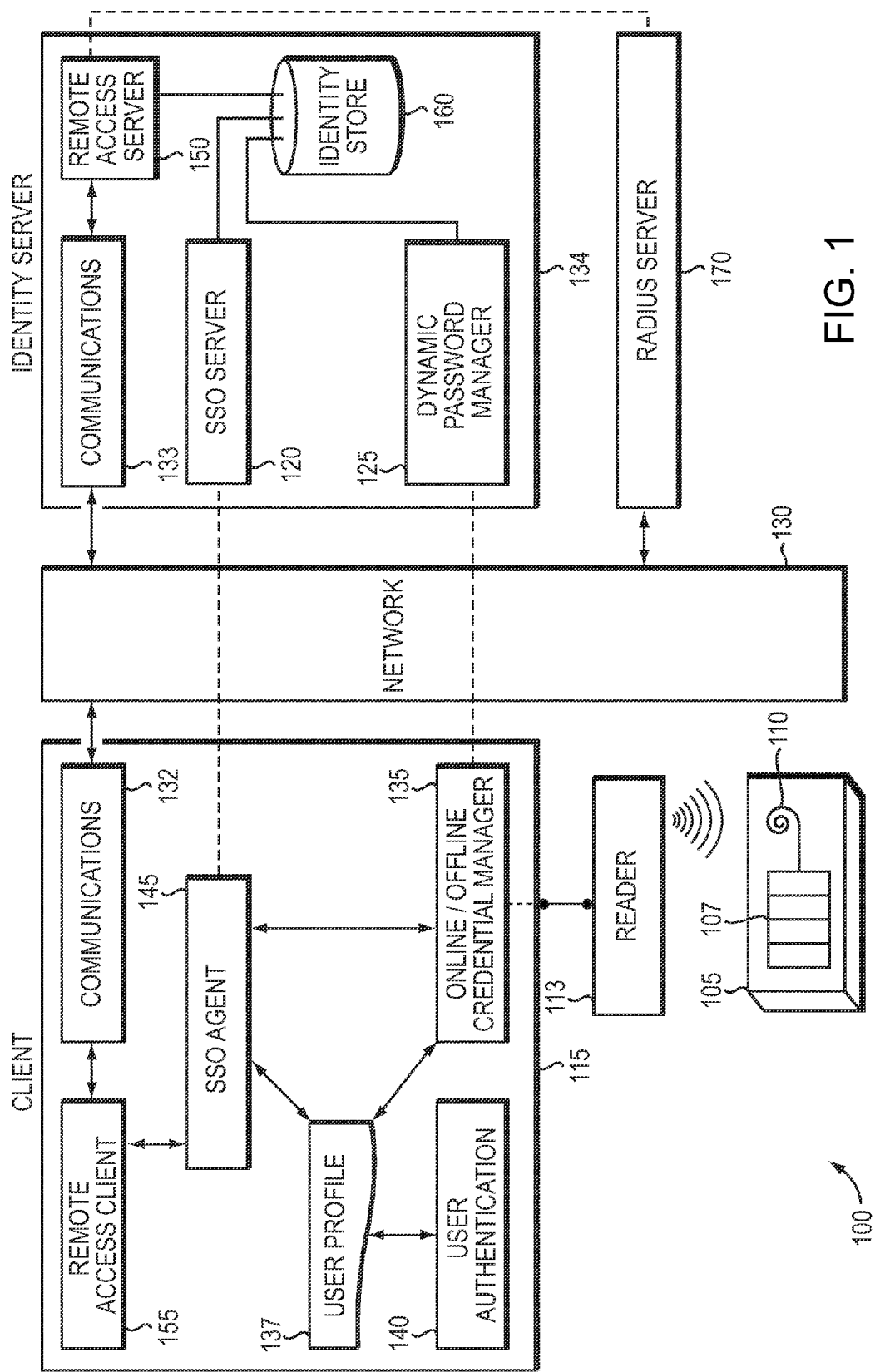
FIG. 1 is a block diagram of a system for authenticating a user to a secure resource in accordance with an embodiment of the invention.

Refer first to FIG. 1, which illustrates the relationships and data flow among the multiple functional components of a representative system implementation 100; these components facilitate the use of SSO applications and OTPs with contactless smart cards.

A smartcard 105 contains a nonvolatile memory store 107 divided into a plurality of physical or, more typically, logical partitions. The smartcard 105 also contains a strip or coil 110 allowing it to communicate with a card reader 113 capable of interrogating the card. MiFare and iClass cards, for example, have an embedded, globally unique serial number that can be read by reader 113. When card 105 is in range of reader 113, data can be read from and written to the card's memory 107.

In the system 100, a first computing system (a "client") 115 communicates with a remote SSO server 120 and a password-management server 125 via a network 130. The client computer 115 is used by one or more users. The client and servers include conventional communication modules 132, 133 that facilitate data exchange via a local-area network (LAN), such as a company intranet, a wide-area network (WAN) such as the Internet, or the like. The client 115 and servers 120, 125 communicate via the network 130 using any of a variety of connections including, for example, standard telephone lines, LAN or WAN links (e.g., T1, T3, 56 kb, X.25), broadband connections (ISDN, Frame Relay, ATM), wireless connections (e.g., 802.11, Bluetooth), and the like. The connections can be established using a variety of communication protocols (e.g., HTTP(S), TCP/IP, SSL, IPX, SPX, NetBIOS, Ethernet, RS232, direct asynchronous connections, a proprietary protocol, and the like). In one embodiment, the client 115 and the servers 120, 125 encrypt all communication when communicating with each other in order to establish and support a trusted communication channel. Each of the servers 120, 125 can be any computing device capable of providing the services requested by the client 115 and described herein. Moreover, although the servers 120, 125 are shown as separate entities, they may in fact be separate applications (or virtual servers) on a single identity-server computer 134. The server 134 may or may not be part of the secure network to which the user desires access.

The client 115 can be any computing device (e.g., a personal computer, set top box, wireless mobile phone, handheld device, personal digital assistant, kiosk, etc.) appropriate to interaction with the servers 120, 125. The client 115 will typically include a network interface within communications module 132, one or more input/output devices such as a keyboard, a mouse, a screen, a touch-pad, a biometric input device, and the like. In addition, client 115 will contain a central processing unit, a system memory, and a system bus that couples various system components including the system memory to the processing unit. Computers typically include a variety of computer-readable media that can form part of the system memory and be read by the processing unit. By way of example, and not limitation, computer-readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system directs the execution of low-level, basic system functions such as memory allocation, file management and operation of mass storage devices. Representative operating systems include the Microsoft WINDOWS operating system, the UNIX operating system, and the LINUX operating system.

Reader 113 may be integrated within or simply connected to (e.g., via a USB port) or in communication with client 115. A credential manager 135, implemented as a processor-executable software application on client 115, manages the confidentiality of stored authentication and SSO credentials (both static and dynamic) and stores them either locally on the client, in a profile memory partition 137, and/or within a secure memory token such as smartcard 105. Encryption keys may be used to unlock these offline credentials, and these keys can also be stored on the client device 115 and/or within the secure memory token 105. Where the reader 113 is integrated within or connected to client 115, credential manager 135 may govern the operation of the reader. The application instructions effectuating the functions of the invention and facilitating interaction with servers via a network, as well as the user profile 137, can reside on a mass-storage device (such as a hard disk or optical storage unit) as well as in a main system memory during operation.

Each time the card 105 is presented to the reader 113, credential manager 113 retrieves one or more dynamic credentials from card 105 for use in remote authentication. The number of credentials may be fixed (e.g., five), may depend on the number used, or may be based on the memory space available. The credential manager 135 typically can read from and write to card 105, and uses the brief period of wireless contact to read and update data on the card.

A client-resident offline user authentication module 140, implemented as a processor-executable software application on client 115, identifies the user using cached, offline authentication data (typically stored in user profile 137). User authentication module 140 functions, for example, when the user first presents a smartcard 105 to reader 113, and may at least initially involve comparison of authentication data stored on the card 105 to user data stored in profile 137. To support a stronger authentication policy or upon the occurrence of events that suggest improper or fraudulent use of smartcard 105, the user's identity may be confirmed to module 140 via user entry of a PIN, a password, biometric and/or other device-based authentication via client 115, which may be compared locally and/or transmitted securely to a remote authentication server for confirmation. For example, each time a card 105 is presented for authentication, a timestamp may be added to the memory 107 of the card indicating the last time of its use. Timestamps are used to thwart brute-force attempts to crack the PIN or password by disabling read access if successive reads are made to the card within some short interval; in such circumstances, user authentication module 140 will require additional user authentication to establish the user's identity.

A single-sign-on agent ("SSO agent") 145, implemented as a processor-executable software application on client 115, monitors the display of application screens on the client 115—e.g., by analyzing browser-renderable markup instructions received via communications module 132 and corresponding to a web page—and automates the delivery of either static or dynamic passwords into log-on forms. OTP passwords are retrieved one at a time from the list of unused, cached dynamic passwords maintained on card 105 (and which may have been locally stored in user profile 137 when the card 105 was presented to reader 113). In some embodiments, card 105 provides the user with a "number remaining" message indicating how many dynamic passwords remain on the card. If the number of available passwords drops below a specified limit, the card may enter a "recharge mode" once the user has successfully logged onto identity server 134 and has access to SSO server 120. The server-side dynamic password manager 125 creates and manages the lifecycle of dynamic passwords associated with a particular user from the moment a password is generated to when it expires.

Although credential manager 135 and SSO agent 145 are conceptually shown as communicating with password manager 125 and SSO server 120, respectively, communication between client 115 and server 134 in fact typically occurs by means of dedicated communication components. Server 134 includes a remote access server module 150 that manages the communications channel through network 130 between remote users and secure resources within the organization. Remote access server 150 and SSO server 120 may have access to a database 160 of encrypted user credentials for all known users entitled to access to secure resources. The database 160 may be physically integrated within identity server 134 or may instead by accessible to the server via a secure network connection. On the client side, a remote access client module 155 validates the user's identity, either locally or through communication with identity server 134 as discussed below, and creates the secured (e.g., VPN) tunnel between the client machine 115 and the secure network—which may or may not include server 134—behind the firewall.

2. Representative Workflow

Figure 2:
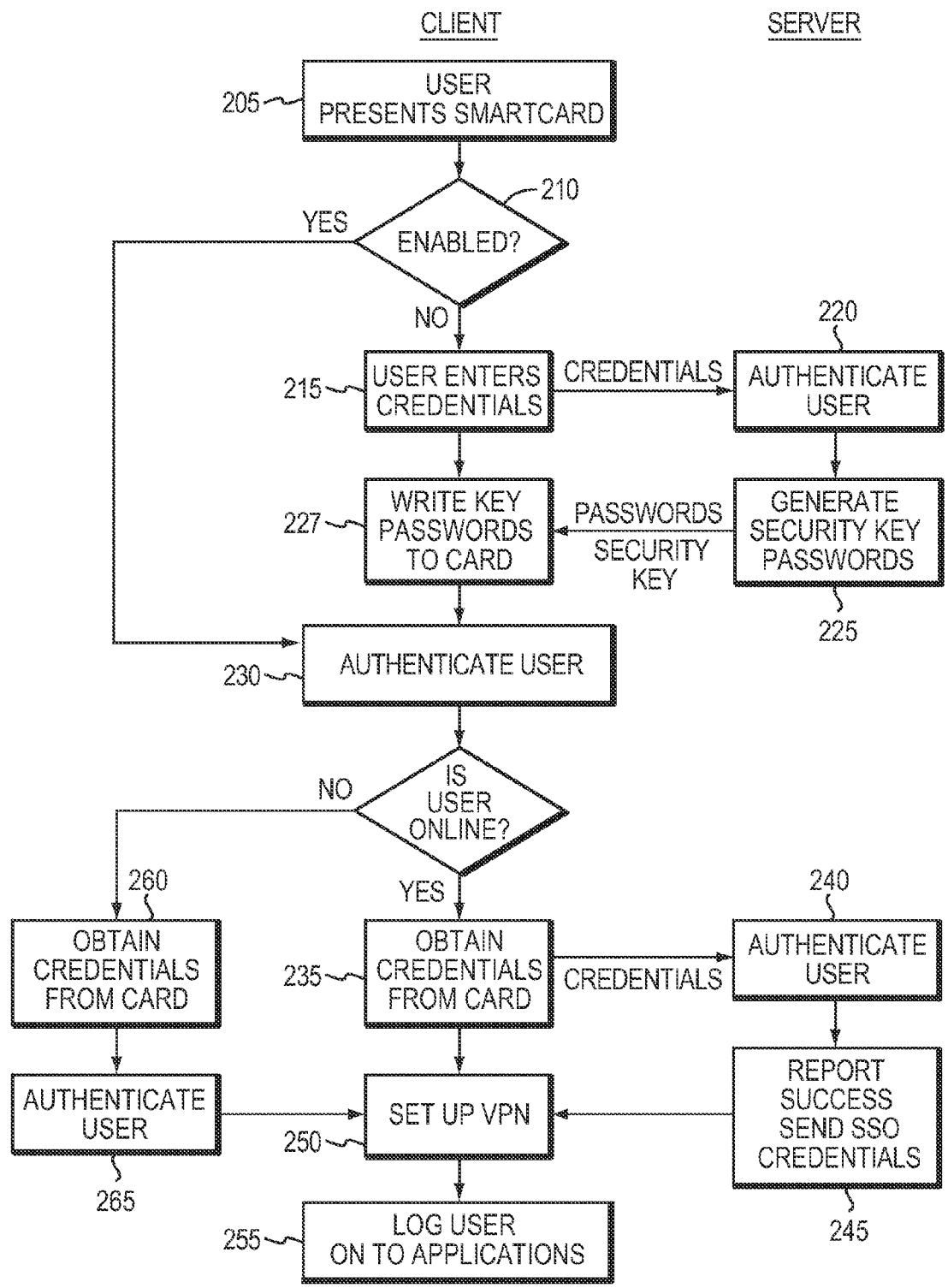
FIG. 2 is a flow diagram illustrating a representative process for online or offline authentication using OTPs in accordance herewith.

FIG. 2 illustrates a representative process 200 by which a user enrolls and subsequently accesses remote, secure resources in accordance herewith. The initial relationship between a card and a user is established through an enrollment process that preloads the user's smartcard with certain critical information such as encryption keys, application data (timestamps, times used, etc.) and, in some embodiments, dynamic passwords. With reference to FIGS. 1 and 2, enrollment occurs when the user presents his smartcard 105 to reader 113 (step 205) and it is not recognized (step 210) by remote access client module 155. While the user keeps his card 105 within range of (or otherwise electronically accessible to) reader 113—which is typically necessary throughout the entire enrollment process since multiple updates are generally required—remote access client module 155 challenges the user to enter valid authentication credentials (e.g., biometrics, PINs, etc.) to client 115 via a keyboard, fingerprint reader or other peripheral (step 215). The credentials are then passed to remote access server 150 (via remote access client 155), which either performs the actual authentication (step 220) or forwards the credentials to a separate authentication server (e.g., Radius server 170) to do so. Upon successful authentication (i.e., a password, PIN, biometric or other credential match), the card's identifier is associated with the user's credentials in identity store 160, and password manager 125 creates a digital certificate or supplies encrypted biometric credentials for the card along with a set of OTPs to be stored thereon (step 225). These are received by credential manager 135, which writes the digital certificate or credentials and OTPs onto the card and also stores them in user profile 137 (step 227). At this point the client 115 tests the success of these operations by interacting with the card as if an already-enrolled user had just presented it for authentication to a secure resource (step 230).

2.1 Online Authentication

In instances in which the client machine 115 is online and can access the identity server 134, placing a card 105 in proximity to reader 113 triggers an online user-authentication process. The digital certificate or other identifier on the smartcard 105, along with the next OTP, are obtained (step 235) and passed to SSO server 120 in the manner described above, and if the credentials match valid data in identity store 160, the user is authenticated (step 240). For example, the digital certificate written onto card 105 may be a private key generated by password manager 125 during enrollment, and which corresponds to a public key (also generated by password manager 125) maintained in identity store 160. If the keys match (i.e., if one key decrypts a message encrypted with the other key), the card is authenticated. Assuming the user has a privilege level entitled to access the secure network, successful authentication is registered and reported to remote access client 155 (step 245), which may thereupon create a VPN (step 250) to the secure resource.

More specifically, credential manager 135 initially authenticates the card 105 and thereupon establishes a secure channel for reading and writing to and from the secure application area on the card. Credential manager 135 reads critical authentication data and/or credentials (e.g., the digital certificate) from the card to establish the identity of the user, and may require further authentication as described above. Once the user is authenticated, credential manager 135 decrypts static and/or dynamic credentials stored on the card 105 for presentation to various SSO-enabled applications. Dynamic credentials for remote access, for example, allow the SSO agent 145 to detect the log-on screen for VPN access and enter an OTP directly.

When a stored OTP is presented to a log-on dialog and sent to identity server 134, the server-side password manager 125 is called to verify the association between the entered OTP and the user. In some embodiments, the presentation of a valid OTP forces invalidation of OTPs that were generated with an earlier timestamp. For example, an OTP entered by the user and received by remote access server 150 may be validated by passing it for confirmation to the dynamic password manager 125 that originally generated the random password. If the OTP is valid, remote access server 150 returns the success message to remote access client 155 and simultaneously marks the OTP as having been used. At the client 115, the OTP may be deleted from card 105 (via reader 113) and from user profile 137.

If SSO agent 145 is enabled, following user authentication the SSO agent 145 can automate the delivery of the log-on OTP directly into log-on forms (e.g., a VPN dialog) received by client 115 via the network 130 (step 255). In this way, SSO agent 145 establishes secure sessions with remote applications the user is entitled to access without the need for the user to interact with and supply credentials to log-on forms. As the user attempts to launch an application or to access it remotely, SSO agent 145 detects receipt of the log-on form, obtains the OTP, enters it into the form and submits it to the application. In some embodiments, the application being accessed reads information from card 105 and updates the timestamp for the last known card access with respect to that application. The SSO agent 145 may also receive SSO credentials from SSO server 120 if these are not stored in user profile 137.

2.2 Offline Authentication

If client 115 is offline (i.e., there is no trusted connection between the client and identity server 134), information read directly from card 105 is used to authenticate the user. For example, in VPN implementations, a VPN tunnel does not exist for initial authentication. Consequently, an offline procedure is used to validate the user and, when it is completed successfully, stored OTPs are decrypted so the passwords can be delivered into the log-on screen and passed to the VPN server for verification by the back-end authentication server.

More specifically, placing the card 105 in proximity to reader 113 triggers a read of the user authentication data and OTPs from the card (step 260) that can be used to subsequently automate log-on using the SSO agent 145, if the user is authenticated. User authentication in offline mode differs in not having access to the SSO server 120 and any other authoritative stores that can validate the identity of the user. Accordingly, the user may be asked to provide a fingerprint or password via a peripheral of client 115, and credential manager 135 compares this to data stored in encrypted form in user profile 137 (step 265). But the presence on the card of trusted OTPs, which have been properly generated by password manager 125, permits flexibility here. Some security policies, for example, may presume that the possessor of the card is the proper user—e.g., if the user's physical presence in the facility can be otherwise established, or if the user has recently been authenticated by the online process described above. In this case, so long as a valid OTP remains on the card, the user can be authenticated based solely thereon.

Once a user is authenticated, SSO agent 145 uses the OTP extracted from the card 105 to automate local log-on to secure applications and/or remote log-on to one or more VPN/SSL applications. As the user clicks on an application and is challenged for log-on credentials, SSO agent 145 inserts the next dynamic password into the form and submits the form. Once used, the OTPs are decommissioned and no longer valid, thereby preventing any reuse.

In online authentication, credential manager 135 can communicate with password manager 125 to validate that any received OTPs are assigned to the authenticated user, and to determine whether it has been used already—thereby preventing a "replay attack." In contrast, in offline user authentication, credential manager 135 tracks the frequency of attempts and forces a longer timeout if a number of authentication attempts (successful or not) occur within a short interval.

2.3 Recharging the Card

Because card 105 has finite storage 107, the user "recharges" the card with additional OTPs generated by password manager 125 while the user is logged onto identity server 134. This process may require the user to present card 105 back to reader 113 so the OTP cache can be updated, or may occur automatically once the user has been successfully authenticated. Once recharged, the card should have sufficient OTPs for the next few uses (at least until the user goes back online or establishes contact with SSO server 120 again, at which point the card can be recharged).

More specifically, when the user presents the card 105 for recharging and/or authentication via credential manager 135, dynamic password manager 125 generates a new block of codes and downloads the codes to client 115 for storage in user profile 137; these codes are written out to card 105 via reader 113.

When the user successfully authenticates in offline mode, credential manager 125 retrieves a fixed number of OTPs from card 105 and notifies the user when the number drops below a certain number. This number—the threshold for recharging—may be fixed, or in some cases, user-specific to accommodate users who access a large number of applications on a repeated basis. Once SSO agent 145 successfully communicates in a trusted fashion with identity server 134, additional OTPs for offline use will be generated and written onto card 105.

In summary, embodiments of the invention facilitate the use of a contactless memory token to automate log-on procedures to a remote access server using dynamic OTPs. A series of workflow steps establishes the identity of the user, and charges the card with a number of dynamic OTPs that can be subsequently verified locally or using, for example, a Radius server sitting behind a VPN or SSL/VPN server. An SSO agent, working in conjunction with an SSO server and the Radius server, facilitates secure access to critical applications and systems via remote access modalities without the user having to remember or present any application-specific passwords.

The invention can be embodied in other specific forms without departing from the spirit or essential characteristics thereof. The foregoing embodiments are therefore to be considered in all respects illustrative rather than limiting on the invention described herein.

What is claimed is:

1. A client computer configured for authenticating a user to a secure resource, the computer comprising:
   a processor;
   a client-resident credential-management module, executable by the processor, for obtaining from a secure memory token one or more limited-lifespan user-authentication credentials specific to the secure resource from among a plurality of credentials stored on the secure memory token;
   a communications module, facilitating communications over a computer network, for receiving a user-access form of the secure resource; and
   a client-resident single-sign-on agent, executable by the processor, for providing the at least one resource-specific limited-lifespan user-authentication credential to the user-access form and causing transmission thereof via the communications module to thereby accord user access to the secure resource;
   wherein the client-resident credential-management module authenticates the user based on authentication credentials stored on the client computer.

2. The computer of claim 1 further comprising a reader, in operative communication with the credential-management module, wherein the client-resident credential-management module is configured to interrogate the secure memory token via the reader.

3. The system of claim 2 wherein the secure memory token comprises a contactless smartcard.

4. The system of claim 2 wherein interrogation of the secure memory token comprises writing user-authentication credentials received from a server-resident password manager to the secure memory token.

5. The computer of claim 1 wherein the communications module is configured to facilitate communications over a computer network between the client-resident credential-management module and a server-resident password manager that administers the limited-lifespan authentication credentials.

6. The system of claim 1 wherein the secure memory token comprises one or more secure memory areas each associated with one of a plurality of secure applications.

7. The system of claim 1 wherein the one or more limited lifespan user-authentication credentials comprise one or more of a password, a user identifier, or a biometric credential.

8. The system of claim 7 wherein the one or more limited lifespan user-authentication credentials comprise a plurality of one-time passwords generated by the server-resident password manager.

9. The system of claim 1 wherein the single-sign-on agent facilitates automated log-on of the user to a plurality of applications by means of the one or more limited-lifespan user-authentication credentials obtained by the reader.

10. A method for authenticating a user to a secure resource using a secure memory token, the method comprising:
   storing, on the memory token, a plurality of limited-lifespan user-authentication credentials for presentation to a plurality of different secure resources;
   locally interrogating the secure memory token upon presentation thereof by the user to a client device;
   authenticating the user's identity;
   locally detecting the user's request for access to a remote secure resource;
   retrieving, from the secure memory token, at least one valid limited-lifespan user-authentication credential specific to the remote secure resource for which the access request was detected;
   locally receiving a user-access form of the requested remote secure resource; and
   automatically populating the user-access form of the remote secure resource with the limited-lifespan user-authentication credential, thereby permitting user access to the remote secure resource.

11. The method of claim 10 further comprising replenishing the secure memory token with additional limited-lifespan user-authentication credentials.

12. The method of claim 11 wherein the secure memory token is replenished based on comparing a number of remaining valid credentials stored on the token to a minimum credential threshold.

13. The method of claim 10 wherein the automatic population step comprises:
   detecting, at the client device, receipt via a computer network of browser-renderable instructions encoding a log-on screen; and
   at the client device, injecting the one or more of the limited-lifespan user-authentication credentials received from the secure memory token into the log-on screen, and submitting the log-on screen to its source.

14. The method of claim 10 wherein the user's identity is authenticated based on a user-authentication credential stored on the secure memory token.

15. The method of claim 10 wherein the user's identity is authenticated locally.

16. The method of claim 10 wherein the user's identity is authenticated remotely according to steps comprising:
   remotely receiving the limited-lifespan user-authentication credential and a user identifier;
   determining whether the limited-lifespan user-authentication credential could have been generated for the user, and if so, authenticating the user's identity.

17. The method of claim 16 further comprising validating, by communication between a local resource and a remote resource, that the limited-lifespan user-authentication credential has not already been used.

18. The method of claim 10 further comprising decrypting the limited-lifespan user-authentication credential prior to using the limited-lifespan user-authentication credential to populate the user-access form.

* * * * *